United States Patent [19]

Assink

[11] Patent Number: 4,908,084

[45] Date of Patent: Mar. 13, 1990

[54] SUBSTRATE CONVERING METHOD AND APPARATUS

[76] Inventor: Kenneth Assink, 13395 Tyler St., Holland, Mich. 49424

[21] Appl. No.: 273,410

[22] Filed: Nov. 18, 1988

[51] Int. Cl.[4] ............................................. B32B 31/20
[52] U.S. Cl. ...................... 156/212; 29/449; 53/220; 156/216; 156/227; 156/245; 156/475; 156/488; 156/493; 156/500
[58] Field of Search ............... 156/245, 500, 196, 212, 156/213, 214, 216, 227, 303.1, 381, 443, 475, 483, 488, 493; 425/502, 503, 517, 112, 817 R; 264/248; 53/486, 357, 362, 220; 29/428, 432.1, 446, 448, 449, 509, 525

[56] References Cited

U.S. PATENT DOCUMENTS

| | | |
|---|---|---|
| 1,370,690 | 3/1921 | Jacobs . |
| 2,634,012 | 4/1953 | Copeman . |
| 2,705,522 | 4/1955 | Kamborian . |
| 2,751,963 | 6/1956 | Valentine . |
| 2,985,222 | 5/1961 | Marty et al. . |
| 3,325,329 | 6/1967 | Bolesky . |
| 3,438,108 | 4/1969 | Nash . |
| 3,439,379 | 4/1969 | Graf .................................... 425/517 |
| 3,551,239 | 12/1970 | Newton ................................ 156/213 |
| 3,586,566 | 6/1971 | Van Vleet ........................... 156/213 |
| 4,174,988 | 11/1979 | Moore ................................. 156/213 |
| 4,619,725 | 10/1986 | Muraishi ............................. 156/213 |
| 4,755,120 | 7/1988 | Onnenberg .......................... 156/245 |
| 4,793,784 | 12/1988 | Belleville ......................... 425/817 R |
| 4,793,793 | 12/1988 | Swenson ............................. 425/112 |
| 4,818,331 | 4/1989 | Shimada ............................. 156/213 |

Primary Examiner—Merrell C. Cashion, Jr.
Attorney, Agent, or Firm—Price, Heneveld, Cooper, DeWitt & Litton

[57] ABSTRACT

An upholstery wrapping apparatus and method using a mold having a flexible lip around the open top of the mold cavity so that as a substrate and covering therefore are pushed down into the cavity, the lip deflects and then snaps back to force the flexible margin of the upholstery to wrap around to the back side of the substrate.

32 Claims, 5 Drawing Sheets

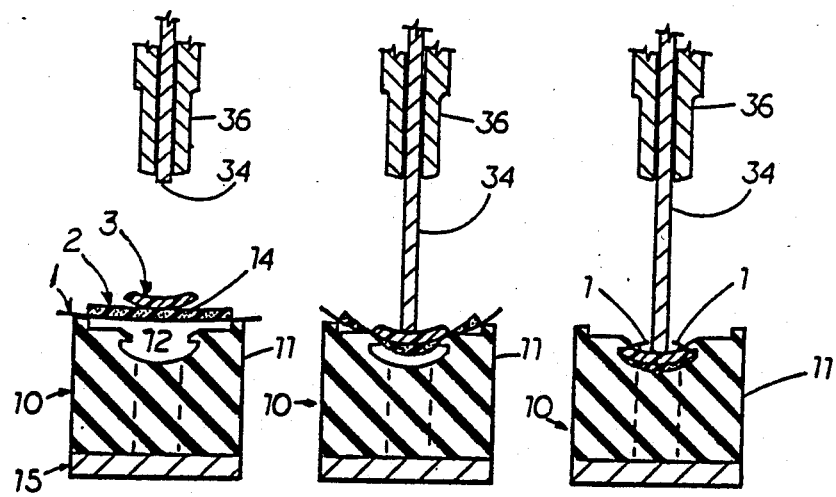
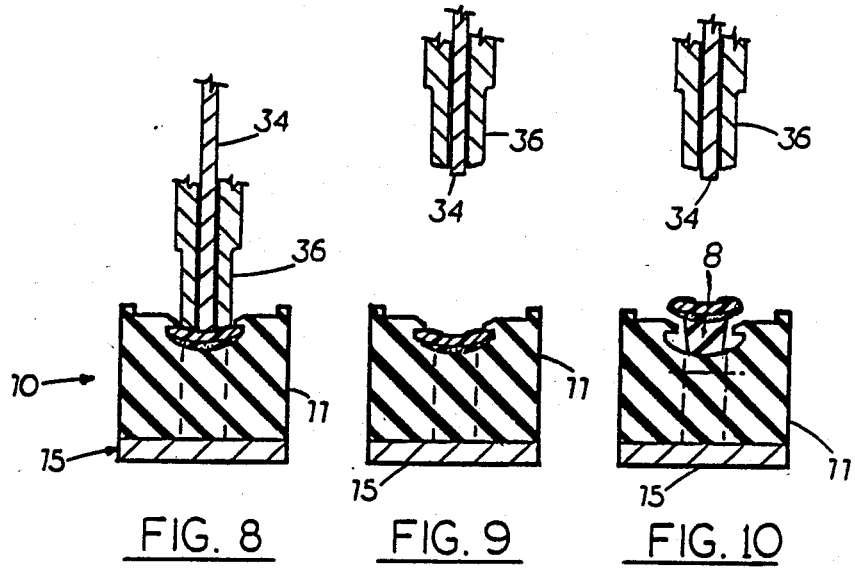
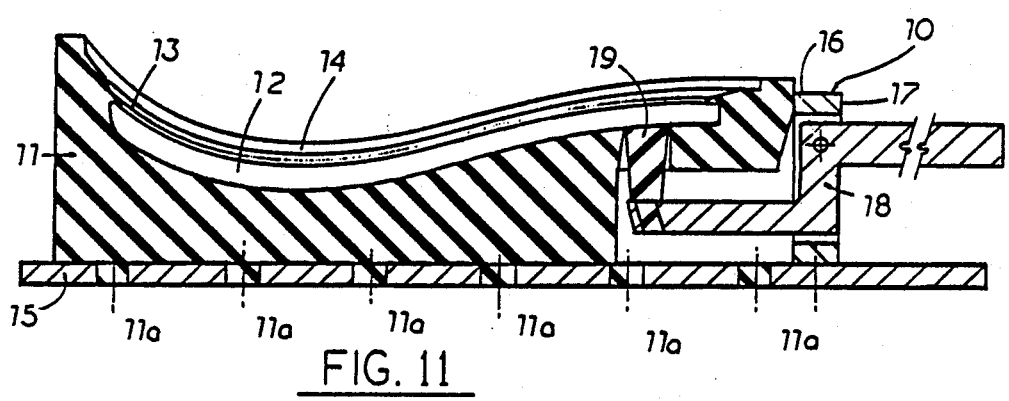

4,908,084

SUBSTRATE COVERING METHOD AND APPARATUS

BACKGROUND OF THE INVENTION

The present invention relates to covering a rigid or semi-rigid substrate with a flexible covering material. The invention is especially adapted for upholstery applications where a rigid or semi-rigid substrate is covered with at least a layer of flexible upholstery and often a layer of flexible cushion or padding material.

When covering such a substrate, one must not only cover the front and sides of the substrate, but also must wrap the upholstery around to the back side of the substrate. Typically, the marginal edge of the covering material is secured to the back surface of the substrate.

It is common to perform this covering operation by placing the fabric and any cushioning material over a mold cavity, push the substrate down onto the upholstery and cushion and then push the composite into the mold cavity. Fingers or clamps then slide over the upwardly projecting marginal edge of the upholstery and push it down onto the back side of the substrate. Glue is often applied to the back side of the substrate so that when the upholstery is pushed down over it, it is adhered to it.

U.S. Pat. No. 3,438,108 to Nash and U.S. Pat. No. 2,705,522 to Kamborian are exemplary of such prior art upholstering methods and apparatus. U.S. Pat. No. 1,370,690 to Jacobs is similar.

U.S. Pat. No. 3,325,329 to Bolesky discloses an alternative upholstery wrapping approach involving a flexible diaphragm and vacuum forming. The upholstery and cushioning are placed over the substrate, located within a cavity. A flexible diaphragm is then placed over the opening of the cavity and the cavity is evacuated. The flexible diaphragm is drawn down against the strategically located vacuum ports in such a way as to force the margin of the upholstery around to the back side of the rigid or semi-rigid substrate being covered.

The use of sliding clamps or fingers as is typical in such upholstery wrapping operations is complicated and leads to maintenance and wear problems due to the numerous moving parts. The vacuum forming technique of Bolesky is not known to have achieved any substantial commercial success.

SUMMARY OF THE INVENTION

In the present invention, wrapping a flexible covering over and around to the back side of a rigid or semi-rigid substrate is achieved by providing a mold having a resiliently flexible lip overhanging and generally surrounding the mold cavity and defining an opening which is smaller in lateral area than the lateral area circumscribed by the substrate. The covering is laid over the mold and the substrate pushed down against the covering and into the mold cavity, past the resiliently flexible lip, deflecting it downwardly. As the substrate passes, the lip is allowed to flex back to its original position, thereby pushing the flexible covering material over the back side of the substrate.

These and other aspects, advantages and features of the invention will be more fully understood and appreciated by reference to the written specification and appended drawings.

BRIEF DESCRIPTION OF THE DRAWINGS

FIG. 5 is a cross-sectional view showing a layer of upholstery, a layer of cushioning and a rigid substrate positioned above the mold, with the present invention injection plunger and sealing plunger poised overhead;

FIG. 6 is the same view as FIG. 5 with the injection plunger shown pushing the substrate and covering composite into the mold;

FIG. 7 is the same view as FIG. 6 with the substrate and covering composite injection into the mold cavity complete;

FIG. 8 is the same view as FIG. 7 showing the sealing plunger coming down and sealing the marginal edge of the upholstery onto the back side of the substrate;

FIG. 9 is the same view as FIG. 8 with the plungers retracted and the completed part shown located in the mold cavity;

FIG. 10 is the same view as FIG. 9 with an ejection pin shown ejecting the part from the resiliently flexible mold;

FIG. 11 is a longitudinal cross-sectional view of the mold made in accordance with the present invention;

DESCRIPTION OF THE PREFERRED EMBODIMENT

Figure 1:
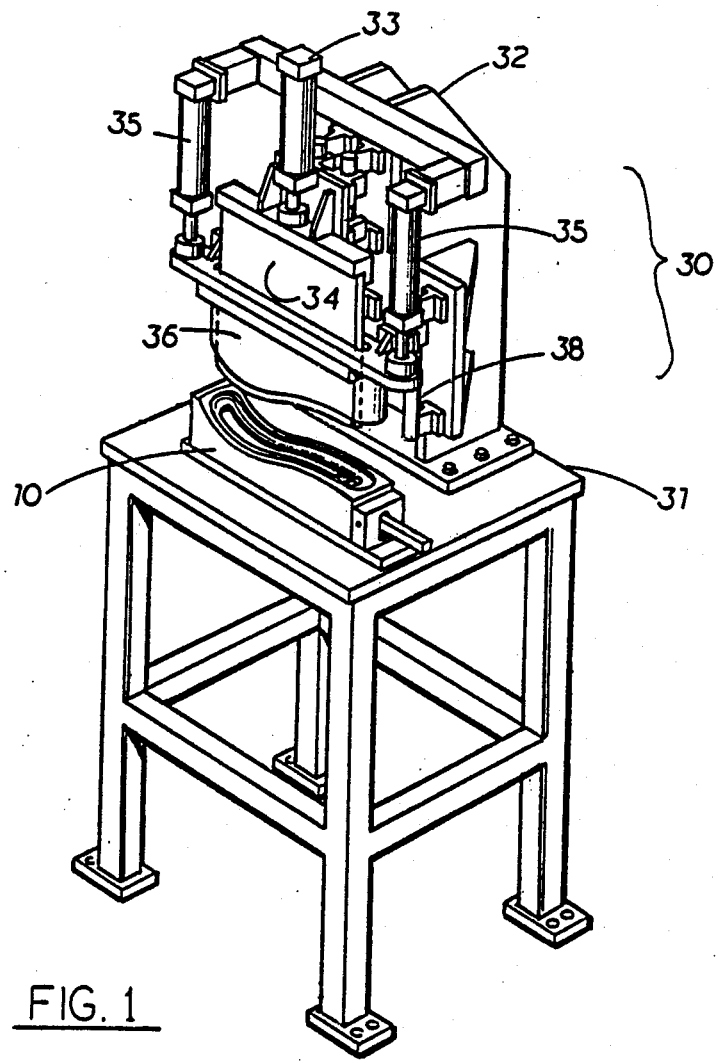
FIG. 1 comprises a perspective view of a mold and mold press made in accordance with the present invention.
Figure 2:
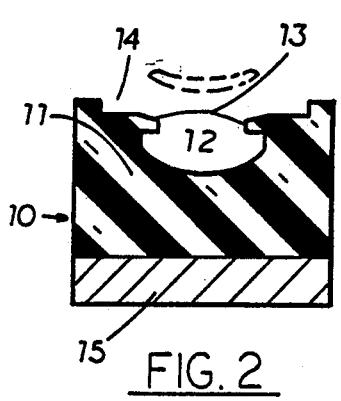
FIG. 2 comprises a cross-sectional view of the mold with a substrate shown in phantom above the mold.
Figure 3:
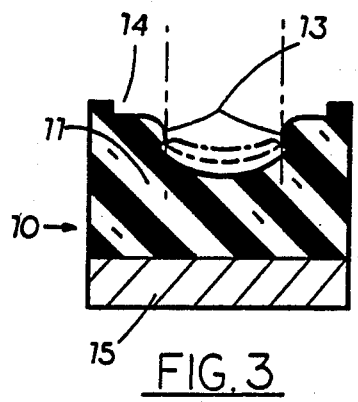
FIG. 3 is the same view with the substrate being pushed into the mold cavity.
Figure 4:
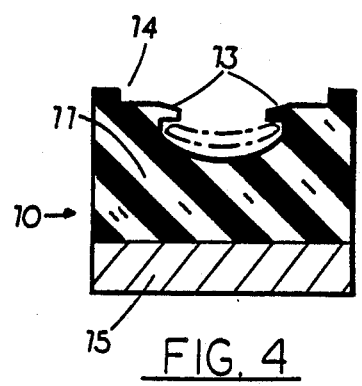
FIG. 4 is the same view as FIGS. 2 and 3 with the substrate shown in place within the cavity.

In the preferred embodiment, mold 10 comprises a body 11 defining a cavity 12 (FIGS. 2–10). A resiliently flexible lip 13 overhangs and generally surrounds cavity 12. A starter recess 14 located above lip 13 and mold cavity 12 helps properly align upholstery layer 1, cushioning layer 2 and substrate 3 in the manner shown in FIG. 5. Press 30 (FIG. 1) includes an injection plunger 34 which pushes rigid or semi-rigid substrate 3 and covering composite comprising a layer of upholstery 1 and a layer of cushioning 2 down into mold cavity 12, past lip 13 (FIGS. 5-7). Sealing plunger 36 is then forced downwardly to seal the marginal edge of upholstery covering 1 against the back side of substrate 3 (FIG. 8). The finished part can then be ejected through the activation of ejection lever 18 and ejection pin 19 in mold 10 (FIG. 11).

Preferably, the entire main body 11, including overhanging lip 13 of mold 10 is molded of a resiliently flexible elastomeric material. Preferably, a polyurethane elastomer is used. Such materials are used for making flexible molds which can be stripped from parts with undercuts. One suitable material is RENC:C:O-THANE ™ RP-6400 polyurethane elastomer available from REN Plastics of Lansing, Mich. (a CIBA-GEIGY Company). This material has a Shore A hardness of 40–45 as determined by ASTM Test Method D-2240. Other elastomeric materials somewhat softer or somewhat harder could be used in the broader aspects of the invention, as for example from about 30 to about 75 on the Shore A scale. However, the aforesaid polyurethane elastomer with a Shore A hardness of 40–45 is currently the best mode contemplated for practicing this invention.

Preferably, mold body 11 is formed onto a steel backing plate 15, around a suitable insert for defining mold cavity 12 and starter cavity recess 14 (FIGS. 2-11). Steel plate 15 has apertures so that a portion of the polyurethane elastomeric resin will flow into the holes and define anchors 11a which help anchor body 11 to steel backing plate 15 (FIG. 11). When the resin has cured, the plug used to form cavity 12 and starter recess 14 ca be peeled out of mold body 11 and mold body 11 and backing plate 15 can be removed from their mold cavity.

To facilitate ejection of the completed part, a steel end wall 16 projects upwardly from backing plate 15 near one end thereof. It includes an opening 17 therein through which an ejection lever 18 extends. A resiliently flexible ejection pin 19 made preferably of the same material as mold body 11 is located on and projects upwardly from the inside end of ejection lever 18. By depressing the outer end of ejection lever 18, one forces ejection pin 19 upwardly and pushes a completed part out of cavity 12 in mold body 11 (FIG. 10).

Press 30 comprises a support table 31 with a cylinder support frame 32 mounted thereon (FIG. 1). Cylinder support frame 32 supports an injection cylinder 33 and a pair of sealing cylinders 35 positioned on either side of injection cylinder 33. The piston of injection cylinder 33 is secured to injection plunger 34 which reciprocates up and down on a slide 37. Injection plunger 34 reciprocates telescopically within a surrounding sealing plunger 36 which is secured to the pistons of sealing cylinders 35. Sealing plunger 36 in turn slides up and down on sealing plunger slides 38. The end of injection plunger 34 is configured to conform generally to the configuration of the rigid substrate 3 against which it seats. Similarly, the end of sealing plunger 36 is configured so as to conform to the configuration of substrate 3 against which it will seat.

In operation, the user places a flexible layer of fabric 1, an optional cushion layer 2 and a rigid or semi-rigid substrate 3 in position within starter recess 14 at the top of mold body 11 (FIG. 5). Injection plunger 34 is then forced downwardly by injection cylinder 33 to push substrate 3, cushion layer 2 and upholstery layer 1 down into mold cavity 12, deflecting resiliently flexible lip 13 downwardly (FIGS. 3 and 6) as they pass and allowing them to snap back into their original position when the upholstery covering and substrate are in place, thereby forcing the marginal edge of the upholstery layer 1 to wrap around to the rear side of substrate 3 (FIG. 7).

Sealing plunger 36 then descends to seal the marginal edge of upholstery covering 1 against the back side of substrate 3 (FIG. 8). This sealing is achieved either by applying an adhesive to the back side of substrate 3 at some point prior to this step and then pushing the marginal upholstery portion tightly against the adhesive, or alternatively by incorporating heaters of one form or another into sealing plunger 36 to effect melt adhesion between upholstery 1 and substrate 3.

The injection and sealing plungers 34 and 36 then retract (FIG. 9) and ejection lever 18 is activated to eject the completed composite part from mold cavity 12 (FIG. 10).

FIRST ALTERNATIVE EMBODIMENT

Figure 12:
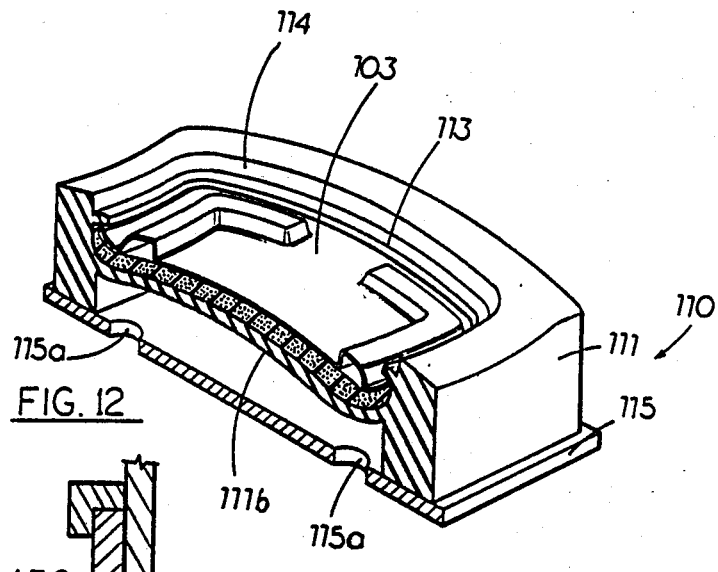
FIG. 12 is a perspective, cross-sectional view of an alternative embodiment mold made in accordance with the present invention.

FIG. 12 shows a first alternative embodiment mold 110 for receiving a substrate 103 of a somewhat different configuration from substrate 3. Mold 110 is made of the same material as mold 10 and includes a main mold body 111 and resiliently flexible lip 113 integrally molded of the same elastomeric material as mold body 11. Similarly, mold body 111 is molded onto and secured to a steel backing plate 115. Mold body 111 also includes a starter recess 114.

Figure 13:
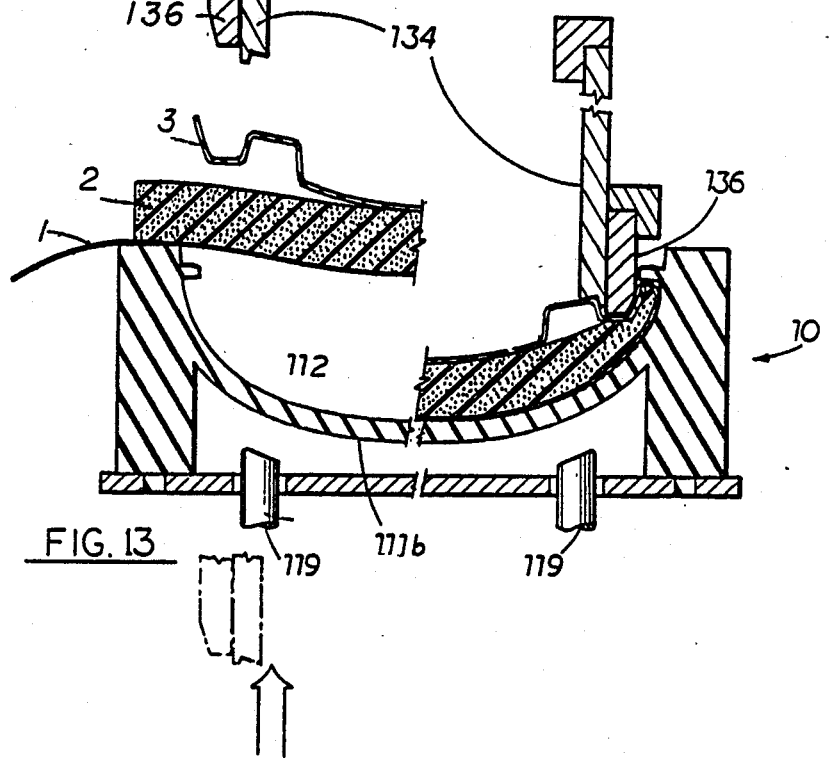
FIG. 13 is a lateral cross-sectional, split view of the alternative embodiment mold and press plungers with the plunger portion on the left side shown in its up position and the plunger portion on the right side shown in its down position.
Figure 14:
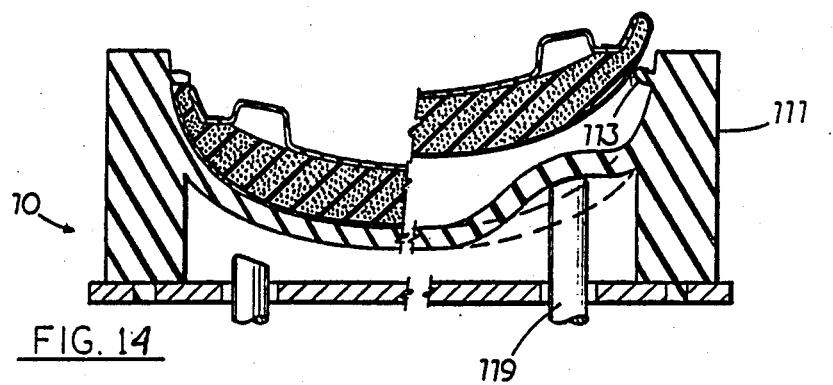
FIG. 14 is the same split view as FIG. 13 with the covered substrate being shown in finished condition in the left fragment of the Figure and being ejected in the right-hand portion of the Figure.

However, mold body 111 is shaped so as to define a resiliently flexible bottom Wall 111b across the bottom of mold cavity 112 (FIGS. 12 and 13). Steel backing plate 115 includes ejector pin apertures 115a located generally below bottom wall 111b through which ejector pins 119 telescopically project (FIGS. 12-14). After a composite part has been formed in mold 110 using a box-like configured injection plunger !34 and an outer box-shaped sealing plunger 136, the completed part is ejected by moving ejector pins 119 upwardly, deforming flexible bottom wall 111b of mold body 111 and forcing the part out of mold cavity 12, past resiliently flexible lip 113 (FIG. 15).

SECOND ALTERNATIVE EMBODIMENT

Figure 15:
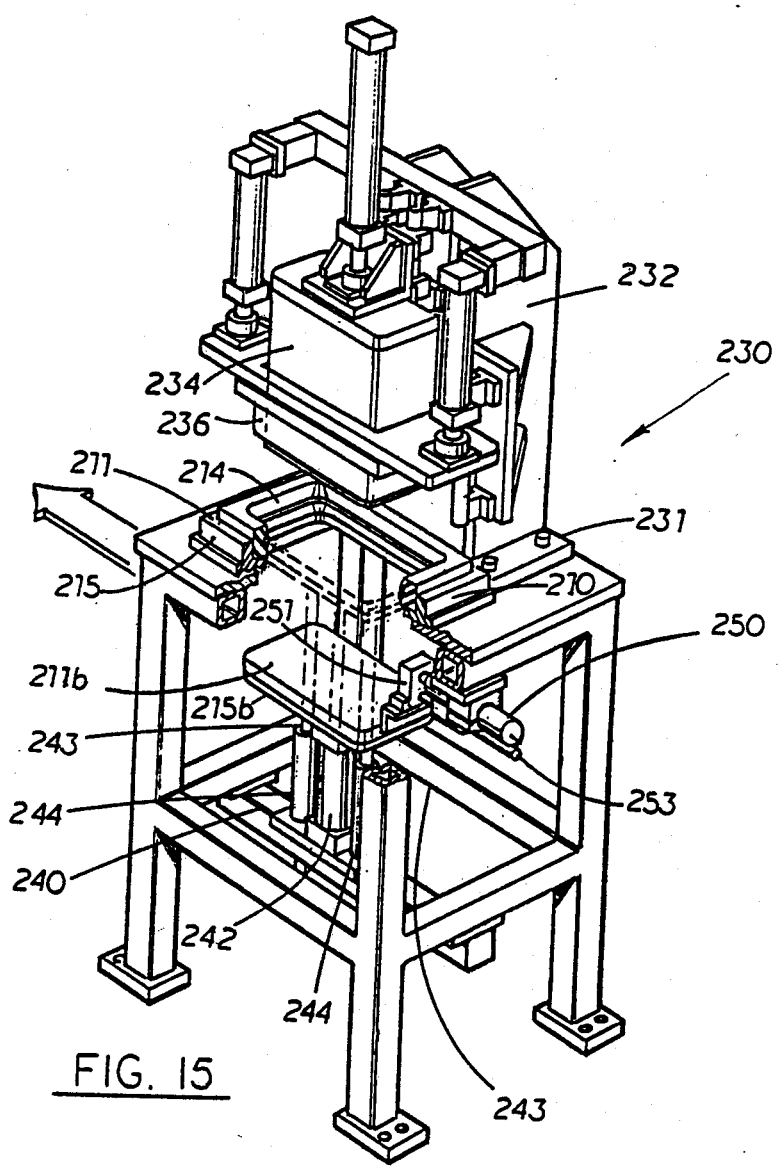
FIG. 15 is a perspective view of yet another alternative embodiment mold and press made in accordance with the present invention.
Figure 16:
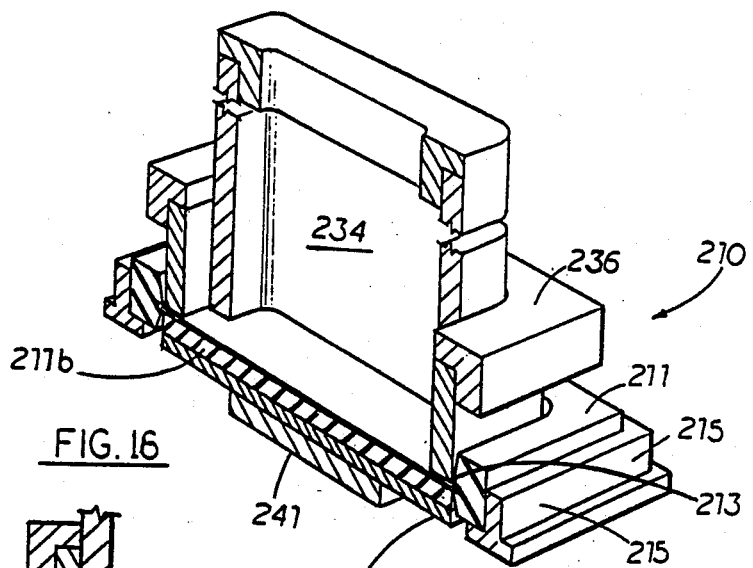
FIG. 16 is a perspective, fragmentary view of the mold and plunger portion of the press.
Figure 17:
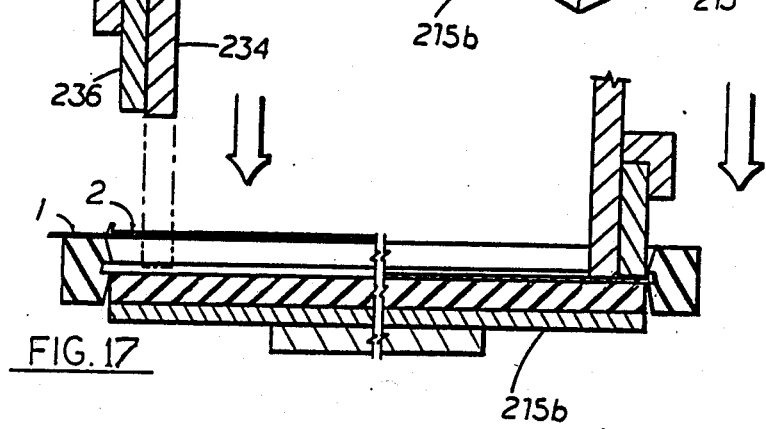
FIG. 17 is a lateral cross-sectional, split view of the third alternative embodiment mold and plunger combination with the plunger portion on the left-hand side of the Figure shown in its raised position and the plunger portion on the right-hand side of the Figure shown in its lowered position.
Figure 18:
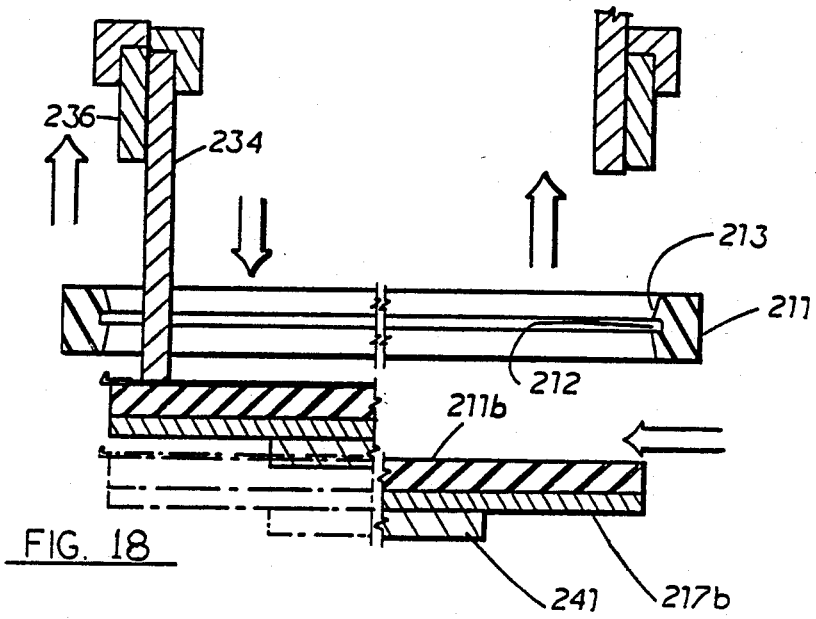
FIG. 18 is the same split view as FIG. 17 with the ejection plunger portion on the left-hand side of the Figure shown ejecting the completed part from the mold and the right-hand portion of the Figure showing the condition of the mold after the part has been totally removed but before the reciprocating bottom of the mold has been returned to its starting position.

FIG. 15 discloses an alternative embodiment including a bottom opening mold 210 and a lateral ejection system 250 located beneath the horizontal surface of press support table 231. Mold 210 comprises a generally rectangular main body 211 including a resiliently flexible lip 213 which overhangs the mold cavity 212 (FIGS. 16-18). Main body 211 is seated in and secured to a peripheral steel backing frame 215 (FIG. 16). Injection plunger 234 and sealing plunger 236 are similar to the rectangular, box-like injection and sealing plungers 134 and 136 of the first alternative embodiment apparatus.

A key difference between the second and first alternative embodiments is that in the second, the bottom portion 211b of mold body 211 is a separate member and is seated on a separate steel backing plate 215b which in turn is secured to a platform 241 at the top of a cylinder 242 of bottom opening assembly 240 (FIGS. 15-18).

The vertical telescoping movement of mold bottom 211b-215b is stabilized by guide rods 243 which are telescopically received within guide cylinders 244 at either side of cylinder 242 (Fig. 15). Mold bottom 211b-215b is maintained in an up position during the injection and formation of the composite upholstered article (FIG. 18) but is withdrawn downwardly by cylinder 242 after the part is formed. Similarly, injection plunger 234 acts as an ejection plunger after the part is formed, pushing the composite part downwardly as mold bottom 211b-215b is retracted (FIG. 18). Injection-ejection plunger 234 is then retracted upwardly and the completed composite part positioned on top of mold bottom 211b in its retracted position is pushed off of mold bottom 211b and onto a waiting conveyor or the like by transfer cylinder 50. Transfer cylinder 250 includes a pusher plate 251 positioned on the end of the piston of transfer cylinder 250 and a suitable guide 253 is provided to stabilize the lateral movement of pusher plate 251 (FIG. 15).

Of course, it is understood that the above are merely preferred embodiments of the invention and that various changes and alterations can be made without departing from the spirit and broader aspects thereof. The scope of the invention is to be defined by the appended claims as interpreted in accordance with the principles of patent law, including the doctrine of equivalents.

The embodiments of the invention in which an exclusive property or privilege is claimed are defined as follows.

1. A method for covering a rigid or semi-rigid substrate comprising:
   providing a mold having a mold cavity and a resiliently flexible lip overhanging and generally surrounding said mold cavity and defining an opening smaller in area than the area circumscribed by said substrate;
   laying covering means over said mold;
   pushing said substrate against said covering means and down into said mold past said flexible lip, deflecting said flexible lip downwardly;
   allowing said flexible lip to flex back to its original position after said substrate and covering means have passed the same to thereby push a marginal edge portion of said covering means over the back of said substrate and place said marginal edge portion in a position to be sealed against said substrate.

2. The method of claim 1 which includes pressing said marginal portion of said covering means which has been deflected back towards said substrate by said resiliently flexible lip against said substrate to seal the same thereto.

3. The method of claim 1 which includes forming a cavity defining body portion of said mold, including said resiliently flexible lip, integrally of the same resiliently flexible material.

4. The method of claim 3 in which said resiliently flexible material is an elastomeric material.

5. The method of claim 4 in which a polyurethane elastomer is used as said resiliently flexible material.

6. The method of claim 5 in which said polyurethane elastomer has a hardness on the Shore A scale of from about 30 to about 75.

7. The method of claim 5 in which said polyurethane elastomer has a hardness on the Shore A scale of 40 to 45.

8. The method of claim 3 in which said cavity defining body portion of said mold is formed on and secured to a rigid backing member.

9. The method of claim 8 in which said rigid backing member includes apertures therein and said mold body includes anchor portions extending into said apertures to firmly anchor said mold body to said rigid backing member.

10. The method of claim 3 which includes providing an injection plunger reciprocally movable above said mold and using said injection plunger to inject said substrate and covering means into said mold cavity, forcing same past said resiliently flexible lip.

11. The method of claim 10 in which a sealing plunger is reciprocally mounted adjacent said injection plunger and is pushed downwardly against the marginal portion of said covering means after it has been deflected downwardly towards said substrate by said resiliently flexible lip, and using said sealing plunger to press said marginal portion of said covering means against said substrate to effect sealing of the two together.

12. The method of claim 1 which includes providing said mold with a flexible bottom for said mold cavity, and movable ejector pins located below said flexible bottom;
   moving said ejector pins upwardly to push against said flexible bottom, deflecting it upwardly and thereby forcing a completed, formed part out of said mold cavity.

13. The method of claim 1 which includes providing said mold with a separate, reciprocally mounted bottom for said mold cavity;
   moving said bottom downwardly to open the bottom of said mold cavity after a part has been formed therein; and
   ejecting said completed part through the opened bottom of said mold cavity.

14. The method of claim 13 which includes providing a transfer cylinder and positioning the same below said mold;
   using said transfer cylinder to move a completed part off of said mold bottom after said mold bottom is retracted from said mold along with a completed part.

15. The method of claim 1 which includes providing an injection plunger reciprocally movable above said mold and using said injection plunger to inject said substrate and covering means into said mold cavity, forcing the same past said resiliently flexible lip.

16. The method of claim 15 in which a sealing plunger is reciprocally mounted adjacent said injection plunger and is pushed downwardly against the marginal portion of said covering means after it has been deflected downwardly towards said substrate by said resiliently flexible lip, and using said sealing plunger to press said marginal portion of said covering means against said substrate to effect sealing of the two together.

17. An apparatus for covering a rigid or semi-rigid substrate comprising:
   a mold having a mold cavity and a resiliently flexible lip overhanging and generally surrounding said mold cavity and defining an opening smaller in area than the area circumscribed by said substrate;
   injection means for pushing a substrate and substrate covering means down into said mold past said flexible lip, deflecting said flexible lip downwardly, and allowing said flexible lip to flex back to its original position after said substrate and covering means have passed the same to thereby push a marginal edge portion of said covering means over the back of said substrate and place said marginal edge portion in a position to be sealed against said substrate.

18. The apparatus of claim 17 which includes sealing means for pressing said marginal portion of said covering means which has been deflected back towards said substrate by said resiliently flexible lip against said substrate to seal the same thereto.

19. The apparatus of claim 17 in which said mold includes a cavity defining body portion, including said resiliently flexible lip, integrally formed of the same resiliently flexible material.

20. The apparatus of claim 19 in which said resiliently flexible material is an elastomeric material.

21. The apparatus of claim 20 in which said resiliently flexible material is a polyurethane elastomer.

22. The apparatus of claim 21 in which said polyurethane elastomer has a hardness on the Shore A scale of from about 30 to about 75.

23. The apparatus of claim 21 in which said polyurethane elastomer has a hardness on the Shore A scale of 40 to 45.

24. The apparatus of claim 19 in which said cavity defining body portion of said mold is formed on and secured to a rigid backing member.

25. The apparatus of claim 24 in which said rigid backing member includes apertures therein and said mold body includes anchor portions extending into said apertures to firmly anchor said mold body to said rigid backing member.

26. The apparatus of claim 19 in which said injection means comprises an injection plunger reciprocally movable above said mold for injecting said substrate and covering means into said mold cavity, forcing the same past said resiliently flexible lip.

27. The apparatus of claim 26 in which said sealing means comprises a sealing plunger reciprocally mounted adjacent said injection plunger for pushing downwardly against the marginal portion of said covering means after it has been deflected downwardly towards said substrate by said resiliently flexible lip, and using said sealing plunger to press said marginal portion of said covering means against said substrate to effect sealing of the two together.

28. The apparatus of claim 17 in which said mold includes a flexible bottom for said mold cavity, and movable ejector pins located below said flexible bottom;
    said ejector pins being movable upwardly to push against said flexible bottom, deflecting it upwardly and thereby forcing a completed, formed part out of said mold cavity.

29. The apparatus of claim 17 in which said mold includes a separate, reciprocally mounted bottom for said mold cavity;
    said bottom being movable downwardly to open the bottom of said mold cavity after a part has been formed therein and means for ejecting said completed part through the opened bottom of said mold cavity.

30. The apparatus of claim 29 which includes a transfer cylinder positioned below said mold;
    said transfer cylinder being operable to move a completed part off of said mold bottom after said mold bottom is retracted from said mold along with a completed part.

31. The apparatus of claim 17 in which said injection means comprises an injection plunger reciprocally movable above said mold for injecting said substrate and covering means into said mold cavity, forcing same past said resiliently flexible lip.

32. The apparatus of claim 31 in which a sealing plunger is reciprocally mounted adjacent said injection plunger for pushing downwardly against the marginal portion of said covering means after it has been deflected downwardly towards said substrate by said resiliently flexible lip, and using said sealing plunger to press said marginal portion of said covering means against said substrate to effect sealing of the two together.

* * * * *

UNITED STATES PATENT AND TRADEMARK OFFICE
CERTIFICATE OF CORRECTION

PATENT NO. : 4,908,084
DATED : March 13, 1990
INVENTOR(S) : Kenneth Assink

It is certified that error appears in the above-identified patent and that said Letters Patent is hereby corrected as shown below:

Column 3, line 40:
   "ca" should read --can--;

Column 4, line 44:
   "!34" should read --134--;

Column 5, line 16:
   "50" should read --250--.

Signed and Sealed this

Fourteenth Day of January, 1992

Attest:

HARRY F. MANBECK, JR.

*Attesting Officer*      *Commissioner of Patents and Trademarks*